United States Patent [19]

Winterholler et al.

[11] 3,995,553

[45] Dec. 7, 1976

[54] PAPER WEB THREADING APPARATUS FOR ROTARY PRINTING PRESSES

[75] Inventors: Johann Winterholler, Friedberg; Hans Jörg Laubscher, Augsburg; Bernd Heinrich, Derching; Josef Plantsch, Augsburg, all of Germany

[73] Assignee: Maschinenfabrik Augsburg-Nurnberg AG, Augsburg, Germany

[22] Filed: Jan. 21, 1975

[21] Appl. No.: 542,808

[30] Foreign Application Priority Data

Jan. 22, 1974 Germany .......................... 2402768

[52] U.S. Cl. ................................ 101/228; 214/1.7; 226/92

[51] Int. Cl.² ...................... B41F 13/54; G03B 1/58

[58] Field of Search .................. 101/181, 219, 228; 214/1.1, 1.4, 1.7; 226/91, 92; 104/135, 147 R, 165, 168

[56] References Cited

UNITED STATES PATENTS

| | | | |
|---|---|---|---|
| 2,862,705 | 12/1958 | Faeber | 271/2.1 |
| 3,346,159 | 10/1967 | Winkler | 214/1.7 |
| 3,537,402 | 11/1970 | Harkess | 104/168 |
| 3,761,001 | 9/1973 | Schunemann et al. | 101/181 X |

FOREIGN PATENTS OR APPLICATIONS

| | | | |
|---|---|---|---|
| 43,925 | 3/1966 | Germany | 101/228 |

*Primary Examiner*—Edgar S. Burr
*Assistant Examiner*—R. E. Suter
*Attorney, Agent, or Firm*—Flynn & Frishauf

[57] ABSTRACT

A plurality of drive elements, such as electric motors supplied with sprockets, are located along a threading path for the paper web of a rotary printing press; a threading element, such as a sprocket chain of a finite length somewhat longer than the maximum space between drive elements is moved along the path, for example, in a guide channel, the threading element cooperating with switches located adjacent the drive elements to energize the drive element adjacent a leading edge of the threading element, and move the threading element along to the next threading element, the trailing end turning the switch OFF since drive power will be supplied by the next drive element along the path. This sprocket chain carries a gripper with which the leading edge of the paper web to be threaded into the printing press can be gripped. The channels guiding the sprocket chain preferably are flexible, for example, plastic, and may be formed with switches so as to short-circuit certain guides of the drive elements, either in the forward threading, or in a return idling path.

18 Claims, 11 Drawing Figures

Fig.1
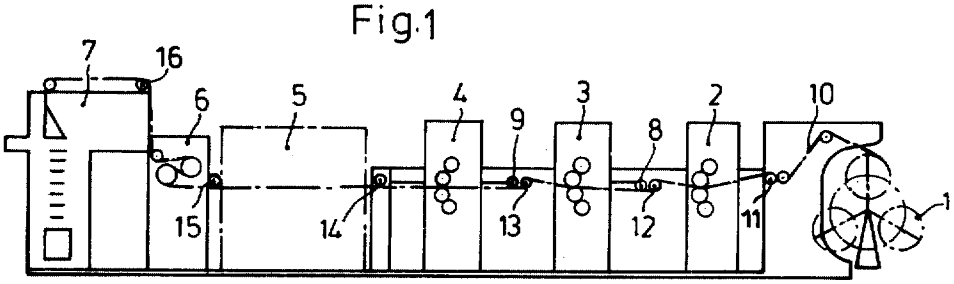
Fig.2
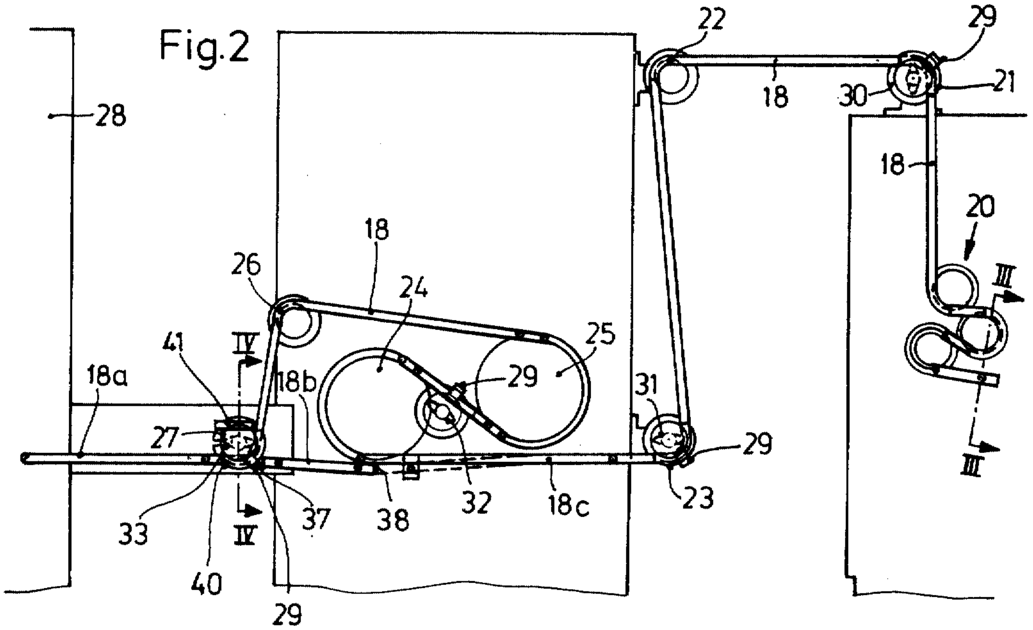
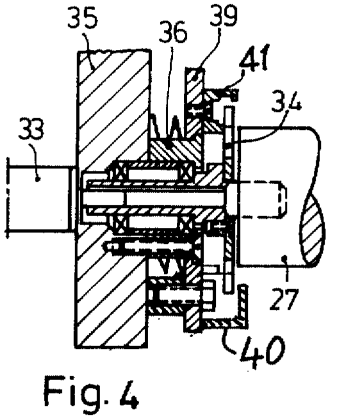
Fig. 4
Fig.3
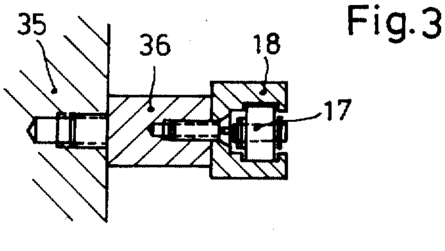

PAPER WEB THREADING APPARATUS FOR ROTARY PRINTING PRESSES

The present invention relates to an apparatus to thread web materials in rotary printing presses, and more particularly to such an apparatus having a flexible threading element which is guided in guide tracks along a threading path.

It has previously been proposed to provide a threading device to thread material to be printed, in web form, in rotary printing machines (see, for example, German Pat. No. 2,021,246, to which U.S. Pat. No. 3,761,001 corresponds). The leading edge of the paper web is gripped by a motorized dolly or carriage, the dolly or carriage being carried on a rack guide track between the side support plates of the printing machine and the paper web, so that the paper web is unrolled from the holding spider thereof and carried through the printing rollers, guide rollers and the like to folding apparatus, through the entire press and along an adjustable guide path. Utilizing a motorized carriage requires supply power to the carriage; this cannot be readily done by exposed wires or by flexible cable and, thus, some energy storage device must be carried along by the motorized carriage or dolly. Carrying this energy storage device requires complicated, rather heavy and expensive guide rails which, further, cannot be laid out with small radii of curvature. Energy being supplied to the motorized carriage from the energy storage device still causes problems, and utilization of the threading apparatus can be limited by the recharge time required for storage batteries.

It has also been proposed (see German Disclosure Document P2241127.4) to use a flexible threading element to thread paper webs into a rotary printing machine, in which the flexible element is guided in guide tracks along a guide path, in a reciprocating motion. The guide element extends over a plurality of printing stations, that is, over the entire length of the machine, and, therefore, moving such a guide element requires substantial power to overcome bending resistance of the guiding element itself, particularly if the threading path has a plurality of sharp bends or curves or loops.

It is an object of the present invention to provide apparatus to thread web material through rotary apparatus having a plurality of rolls, such as a paper web through a rotary printing machine, which is of simple construction and reliable in operation. Additionally, the apparatus should be capable of passing through drying sections of the apparatus, for example, of a printing press, without interfering with the operation of the threading apparatus, nor endangering its structure, its materials or its operation.

SUBJECT MATTER OF THE PRESENT INVENTION

Briefly, a plurality of drive elements are provided, located along the threading path. A single threading element, movable along the path has a length which is just slightly larger than the maximum distance between adjacent drive elements. The drive elements themselves are selectively energized and de-energized by the respective leading and trailing edges of the threading element, so that, as the threading element is pushed forward by a drive element and reaches the next drive element, the next drive element is energized, gripping the threading element and, preferably simultaneously, the drive element adjacent the then trailing end of the threading element is de-energized.

The system permits threading large printing presses, with uniformly adjustable tension, as well as associated equipment, while using only little space and having low energy requirements. Overlap of operation of subsequent drive elements and consequential malfunction in movement of the threading element are reliably avoided.

Each one of the drive elements preferably includes a drive wheel operated by a motor, for example, a sprocket, so that the threading element can readily be passed through the guide path. The threading element is driven from the drive wheel either by frictional engagement or, preferably, is constructed as a sprocket chain engaged by a sprocket wheel driven by the respective motor.

In accordance with the preferred embodiment, pneumatic motors are used as the drive elements. Pneumatic motors, particularly compressed air motors, permit ready adjustment of the torque derived from the motor and readily permit reversal of operation. Such motors, further, are explosion-proof and may therefore be used with gravure printing machines. Pneumatic motors have long life and do not require friction clutches, which is a substantial advantage of their use. Compressed air is usually available in printing plants.

Using sprocket chains as the threading elements permits constructing guide tracks for the guide path to have low friction and to operate the threading apparatus with low noise level. Sprocket wheels, mounted to the shafts of the drive elements and driven by the drive motors directly or by means of a belt or the like, permit excellent connection of the threading element to the drive motor and results in a simple, essentially uniform, easily controllable overall drive system. The guide tracks for sprocket chains preferably are made of plastic, of suitable cross-sectional profile, so that the guide tracks themselves, defining the guide path, then combine with sprocket chains as the threading element, permitting simple, inexpensive manufacture while resulting in quiet operation.

In multicylinder printing presses it is frequently desirable to permit various threading paths. It is readily possible to so construct the guide tracks that separate guide paths are provided, separated from each other and connected by transfer switches. The forward direction of the threading element can thus be changed with respect to the reverse direction; transfer of the threading path from single-sided to double-sided printing can readily be effected. This is particularly easy if the switch tongue for the guide track is formed as an elastic element. The switches may also be constructed in the form of turntables which are rotatable, held in a predetermined position by an axially resilient mounting, and can be changed as desired by mere rotation thereof. Movable track sliders may also be used to construct switches. Similarly, a resilient tongue, in the region of the crossover of two tracks, readily permits change over of the path to be followed by the threading element.

The web is connected to the threading element, preferably with a sprocket or roller chain, by means of a strip of sheet metal which, in cross-section, is essentially V-shaped, the two legs of the V being resiliently pressed against each other to grip the leading edge of a paper web there between. The paper web, after having been pinched between the sheet metal strips, is thereby reliably attached to the flexible threading element, to be pulled thereby through the threading path, thus rapidly threading the web into the printing machine.

The invention will be described by way of example with reference to the accompanying drawings, in which:

FIG. 1 is a highly schematic side view of a rotary offset printing press having three printing stations;

FIG. 2 illustrates a paper web path, differing from that shown in FIG. 1, to an enlarged scale;

FIG. 3 is a schematic transverse sectional view along line III—III of FIG. 2;

FIG. 4 is a section along line IV—IV of FIG. 2;

Figure 5:
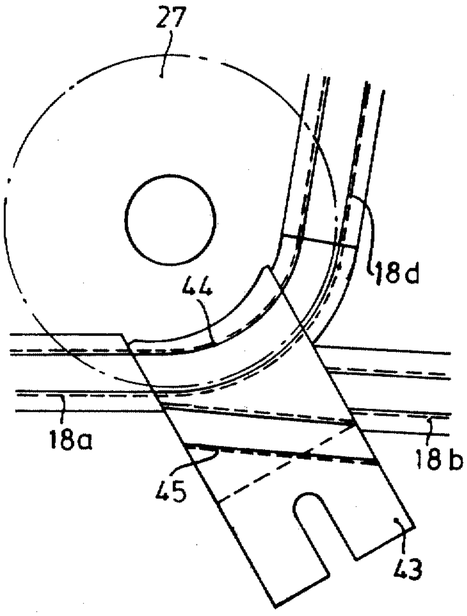
FIGS. 5 and 6 are schematic side views illustrating details of the thread guiding track and switching mechanisms therefor.

The rotary offset press of FIG. 1 has a paper web distribution spider 1, three four-cylinder printing stations 2, 3, 4, a dryer 5, a cooling tower 6, and a folding and stacking apparatus 7. Guide roller pairs 8, 9 are located between the printing stations 2, 3, 4, respectively, in order to prevent flutter or vibration of the paper web pin and to permit introduction of the paper web into the printing station with some circumferential surface contact over the press cylinders. The paper web 10 is threaded through the entire machine array by means of a plurality of drive units 11–16, located along the path of the web. The drive units engage a sprocket, or roller chain, forming a flexible threading element 17 (FIG. 3) which carries grippers 51 (FIGS. 7, 8), which grippers clamp the leading edge of the web to pull the web along, as the threading element is moved. The threading element 17 is longitudinally moved along the threading path by guide tracks 18 (FIGS. 2–4). The guide rails or tracks 18 preferably are made of a dimensionally stable plastic material formed into profile rails, for example, in channel or angle shape. Constructing the tracks or rails of plastic provides low-friction contact between the threading element and the rail and additionally results in quite operation. Change or extension of the threading path, in accordance with modular principles, can be readily accomplished.

The threading path illustrated in FIG. 1 is relatively simple, and essentially straight-line. This is not necessarily so, however, and FIG. 2 illustrates a threading path having a number of bend points in which the web changes direction. The paper web, after having been pulled off the support spider 1 from a roll located thereon, first is guided through a stretcher apparatus 20, by being looped or snaked around three rollers. The web is then guided along the path of track 18 over rollers 21, 22, 23, to a pair of conditioning rollers 24, 25. After having been looped over roller 25, the paper web 10 is conducted over paper-directing rollers 26, 27 to a first printing assembly or printing station 28.

A plurality of drive elements 30, 31, 32, 33 are located at the side wall or support plate of the printing machine. They are uniformly distributed along the threading path. The drive elements are compressed air motors, operating similarly to compressed air turbines. Drive wheels in the form of sprocket wheels 34 (FIG. 4) are secured to the output shaft of the drive motor 33. The sprocket wheels 34 engage a sprocket chain 17. The sprocket chain 17 has rollers of a diameter which is greater than the width of the connecting link elements. The chain 17 is guided within the guide tracks 18 which is formed, in general, as a horizontally located U-shaped plastic profile, that is, as a horizontal channel with a small inwardly extending holding bead at the outer edge. The threading roller chain 17 is transported in the guide channels by one drive element to the next. The length of this roller chain is just slightly greater than the distance between adjacent drive elements. Preferably, the drive elements are uniformly spaced along the threading path; if this is not possible, due to machine construction, then the threading element should be just slightly longer than the greatest distance between drive elements. The guide tracks 18 are secured to the side wall of the machine, schematically shown at 35 (FIG. 3) by means of spacers 36, connected to the side wall by means of holding screws. The guide tracks, of course, are located on the inside (with respect to the rollers about which the paper web travels) of the machine.

Operation, with reference to FIG. 2: The paper web 10 is threaded in the path illustrated in FIG. 2 by first introducing the leading end of the sprocket roller chain forming the threading element 17, with the leading edge of the paper web attached thereto (as will appear below), into the guide track 18 between the rollers of the stretcher apparatus 20 and the next roller 21, until the leading end of the threading roller chain 17 is engaged by the sprocket wheel 34 of the first drive motor 30. Pneumatic switching elements 29 are provided, for example, in the form of customary pneumatic reflex nozzles. A switching signal is generated by means of pressure change which automatically starts the compressed air motor 30 to pull and then push the threading element 17 until it reaches the region of the guide roller 23 and until the leading end of the threading element engages the sprocket wheel of the drive element 31. The pneumatic reflex nozzles are located along the threading path, spaced by the distance of the drive elements 32, 33. When the threading element 17 passes past such a nozzle, a switching signal is generated by pressure change arising in front of the nozzle, to energize the respective compressed air motor. These nozzles may, of course, also be located along the threading path, at suitable locations, corresponding to just under the maximum length of the threading chain. A pneumatic reflex nozzle, located adjacent pneumatic motor 31, then energizes motor 31 and, simultaneously disconnects power to the drive motor 30, as soon as the threading roller chain 17 reaches the respective nozzles controlling motor 31 and leave the nozzle controlling the motor 30. Continuous and uniform tension on the threading element can readily be obtained by suitably adjusting the compressed air pressure. Tearing of the paper web can thus be avoided. The threading element 17 is transported along the further path, in similar manner, until it reaches the drive element 32, at which time drive element 32 is energized and drive motor element 31 is connected. Similarly, the threading roller chain 17 is then transported to drive motor 33, and so forth.

Figure 9:
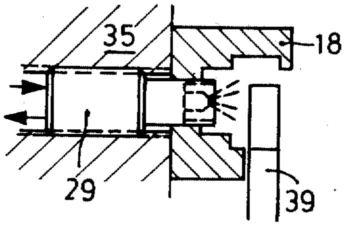
FIGS. 9 and 10 are schematic sectional detailed views of sensing switches to sense the presence of the threading element.
Figure 10:
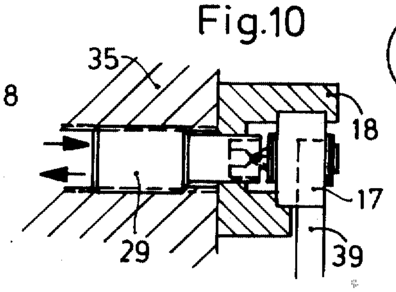

The signal generating reflex nozzle 29 is illustrated in detail in FIGS. 9 and 10. In the illustration of FIG. 9, the threading roller chain 17 has not yet reached the signal nozzle. Compressed air may, therefore, escape from nozzle 29 without interference and back pressure. When roller chain 17 reaches the position shown in FIG. 10, back pressure will result, thus signaling a pressure change, which triggers a switching signal or pulse.

Figure 11:
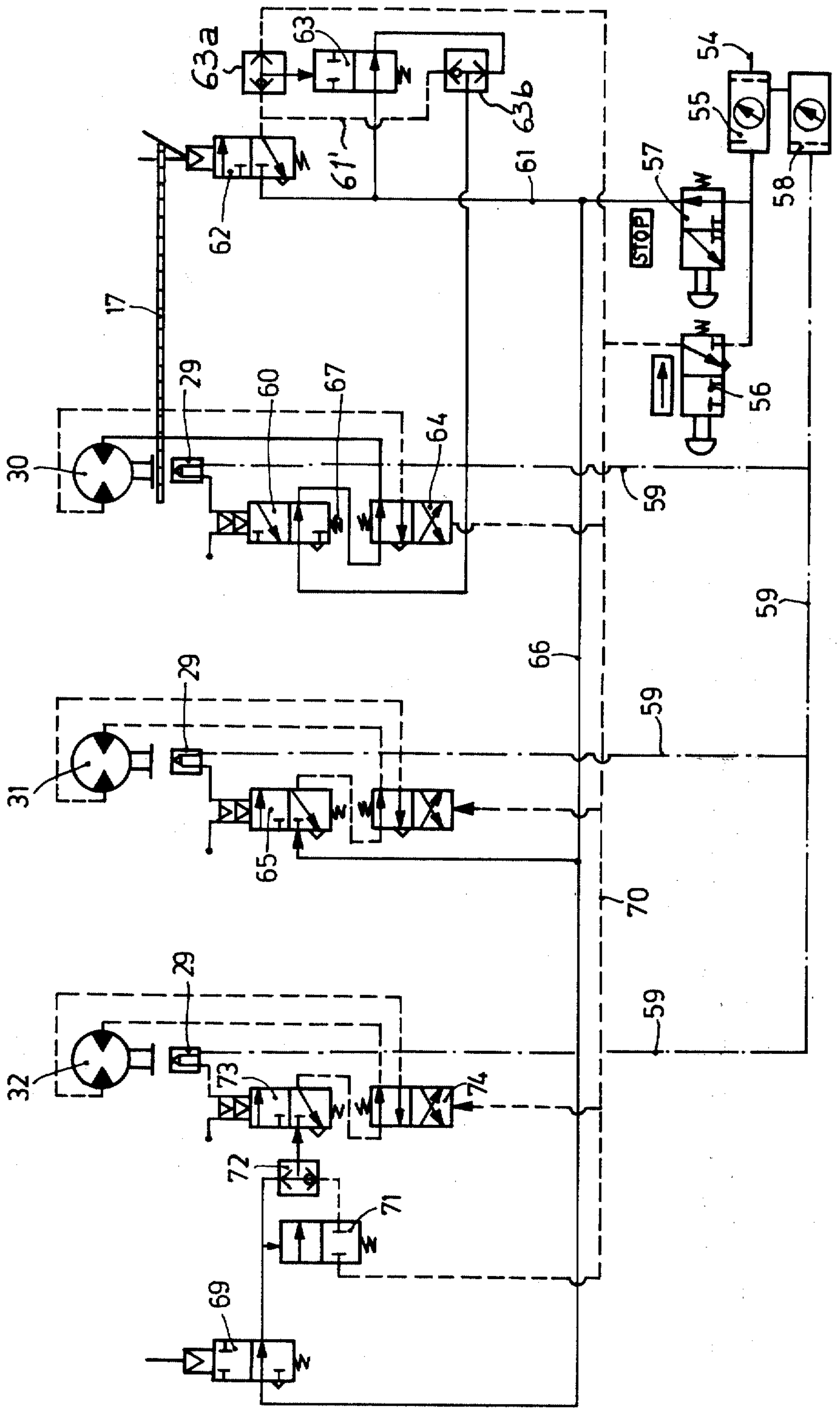
FIG. 11 is a switching diagram for the control system of the drive motors and drive elements of the web threading apparatus.

FIG. 11 illustrates a control system, in pneumatic form, to energize, that is, connect, and de-energize or disconnect, the respective drive motors 30, 31, 32 as the threading roller chain 17 travels along the threading path.

When the printing machine is first turned on, compressed air is supplied from compressed air main line 54, over an inlet unit 55, to a forward-reverse switch 56 and ON STOP switch 57. The inlet unit 55 preferably includes a filter, a pressure regulator (typically, a pressure reducer) and an oiler. The switches 56, 57 control the direction of operation, as well as permitting manual, supervisory stop control.

Air is supplied also from inlet unit 55 to a pressure reducing valve 58, in which the air pressure is reduced to about 200mbar. This reduced pressure is supplied to the nozzles 29 over lines 59. Upon turning swtich 57 ON, that is, placing it in the position shown in FIG. 11, compressed air of sufficient pressure to operate the motors is supplied to lines 61 and 66, to be supplied to three/two way valves 60, 65, 73, controlled by the reflex nozzles 29. The terminal or end switch 62 is held in closed position by the threading roller chain 17 (as illustrated in FIG. 17). Additionally, the positioning piston 63 is vented due to the position of the direction valve 56, as shown in FIG. 11, and, therefore, compressed air is directed from inlet line 61 through the positioning piston 63 to valve 60. The compressed air, at pressure to operate the motor, is conducted through the valve 60 — which is in the position shown in FIG. 11 — due to the back pressure in advance of the reflex nozzle 29, which shifted the valve to the position shown, so that the operating compressed air is applied to the positioning piston 64 and, hence, to the pneumatic motor 30, Motor 30 will begin to rotate and pulls and then pushes the threading chain 17 through the threading path (omitted from FIG. 11 for clarity) until the threading chain 17 reaches the next motor. As soon as chain 17 leaves the region of switch 62, switch 62 changes over, thus changing position of the piston 63. Compressed air under working pressure is then supplied through valve 62 directly to the valve 60, that is, over the connecting line 61'. Check valves **63*a*, 63*b* will change position from that shown in FIG. 11.**

When the threading roller chain reaches the nozzle 29 associated with drive motor 31, then the valve 65 switches over from the position shown in FIG. 11, automatically by back pressure on valve 29, thus supplying compressed air under operating pressure to motor 31, to rotate motor 31. Thus, chain 17 is continuously pulled or pushed, respectively, by the various motors located in stack-up spaced arrangement along the threading patch.

As chain 17 reaches a new sensing nozzle 29, the trailing end thereof leaves the sensing nozzle 29 of the preceding motor, in the illustration of FIG. 11, when the leading edge of chain 17 has reached nozzle 29 associated with motor 31, the trailing end leaves nozzle 29 associated with motor 30, As soon as the back pressure on nozzle 29 ceases, restoring spring 67 restores valve 60 to the position not shown in FIG. 11 (and corresponding to the position shown for valve 73 in FIG. 11), due to failure of back pressure on nozzle 29. Compressed air, under motor working pressure is thus blocked from reaching motor 30 which will stop.

Continued further travel of roller chain 17 through the threading path will cause operation of subsequent motors and control elements in similar manner.

A final "OFF" switch is provided at the terminal end of the machine, to discontinue operation of all of the drive motors when threading is completed. Final OFF switch 69 disconnects compressed air under working pressure from motor 32. When motor 32 has stopped, threading of the paper web through the machine is completed. The two/two way valve 17 opens upon disconnection of operating pressure from motor 32.

The threading element 17 is not removed from the tracks, however, but can be returned through the threading path or through alternate paths, as desired. To return threading roller chain 17 to its initial position, switch 56 is operated so that compressed air will be conducted to line 70, shown in dashed lines; further, the two/two way valve 71 and the double check valve 72, connecting lines 66 and 70, permits compressed air to reach the three/two way valve 73. Three/two way valve 73 then provides working pressure to switch-over piston 74 which changes the direction of rotation of the compressed air motor 32 by supplying compressed air to that side of the motor 32 which previously was the outlet (so that the prior inlet now becomes the outlet), causing motor 32 to operate in the opposite direction. The previously described sequence will repeat, except that the motors 32, 31, 30 will operate in a reverse direction, the motors automatically starting and stopping under control of back pressure to the respective nozzles 29. This procedure continues until the start switch 62 which, now, becomes the final switch, is operated.

The threading paths as well as the return paths need not be identical to each other for all threading operations, nor need they be indentical for forward and reverse movement of the threading element 17. Referring again to FIG. 2, threading element 17, in the threading path, is guided over roller 23 and then over the conditioning rollers 24, 25, deflection roller 26 to roller 27. Return of the threading element can be shorter, by conducting threading element 17 from roller 27, directly back to roller 23. To permit change of the path of the rollers, guide rail 18 is made in such a way that it either is supplied with switches, flexible elements or the like.

Referring to FIG. 2, guide rail 18 is made to be elastically deformable in the region between drive element 31 and drive element 33. A subdivision guide element as seen between points 37, 38 is provided. A rotary switch disk 39 (FIG. 4) is located on the shaft of the paper web guide roller 27 (or on the spacer 36, respectively). The switching disk 39 has secured thereto a bent guide track element 40, extending over about 90° at one diametrical side of the disk; an essentially straight guide track element 41 is secured to disk 39 at the other diametrical side thereof (see FIG. 2). The rotational position of disk 39 determines which one of the track elements 40, or 41, respectively, is matched to the guide track sections at the right of disk 39. Disk 39 is axially movable against spring pressure (see FIG. 4) on spacer 36. In FIG. 2, the bent element 40 is at the bottom, connecting the track section 18 between the roller 26 and roller 27 to track section 18*a*. Upon rotation of disk 39, the straight track section 41 located thereon will be located at the bottom of the disk. The straight track portion 18*d* will thus be connected to track portion 18*a*. The elastically deformable track portion 18*c* is then bent to form a prolongation of the track section 18*b*, so that the return path for the threading roller chain 17 will be a straight line 18*a*-41-18*b*-18*c*, rather than following around the guide roller 26 and the conditioning rollers 25, 24. Such switch arrangements may, of course, be located at any desired position and may be arranged also in the forward half, for example, in order to change the path of the web as it passes through multicylinder printing presses, in order to change the paper path for different printing arrangements.

FIG. 5 illustrates another embodiment of a switch arrangement to change the threading path and using the position of roller 27 as an example. The slider 43 is located at the junction between the guide track elements 18*a*, 18*b* and the connection 18*d* which forms the connection to roller 26. The slider 43 has a curved track section 44 formed thereon which forms the transition between the track sections 18*a* and 18*d* and, further, a straight track section 45, to form the transition between track portions 18*a* and 18*b*. Depending upon the position of the slider 43, either path may be commanded.

Figure 6:
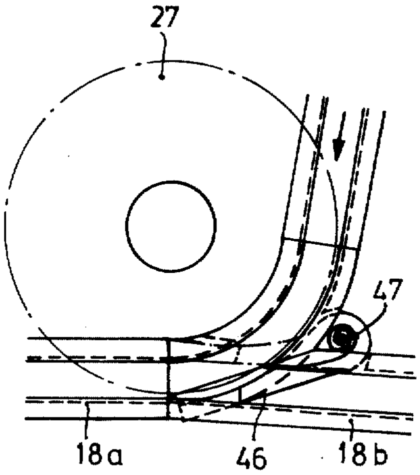

FIG. 6 illustrates yet another embodiment of a suitable switch. A spring biased tongue 46 is located in the region of the junction of the two paths for the threading element adjacent the guide roller 27. The tongue 47 is normally held in the chain dotted position by spiral spring 47. When the leading edge of the threading element 17 engages tongue 46, it is deflected into the full line position. After the trailing edge of the chain has passed the tongue 46, it returns under spring pressure to the chain dotted position, so that, upon reverse movement of the threading chain, the threading chain 17 will automatically take the straight line path connecting track sections 18*a*, 18 *b*.

Figure 7:
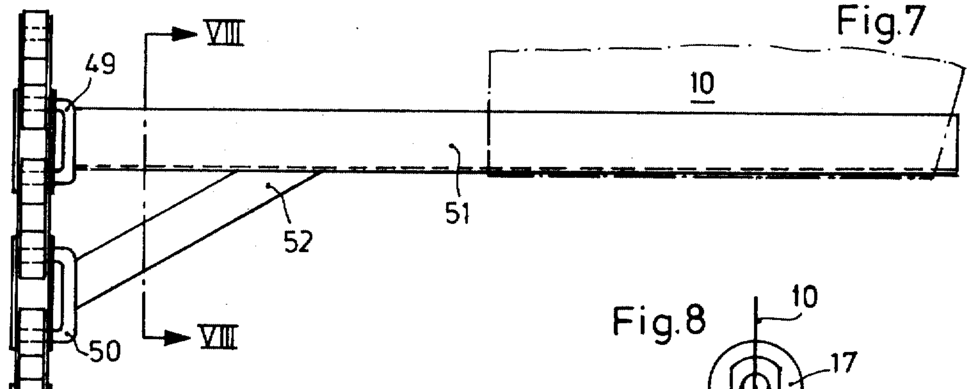
FIG. 7 is a schematic top view of a holding apparatus for the paper web.
Figure 8:
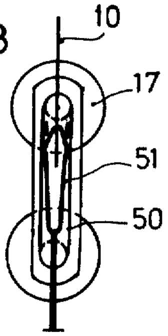
FIG. 8 is a side view of the holding apparatus in FIG. 7, looked at in the direction of the arrows VIII—VIII.

The leading edge of the paper web 10 is clamped to the sprocket roller chain forming the threading element 17, as shown in FIGS. 7 and 8, by gripping means formed by clamps 51. A pair of attachment connectors 49, 50 are secured to the roller chain 17 (FIG. 7). Connector 49 carries a strip of sheet metal, plastic or the like forming to clamp 51. When open, the strip of sheet metal has essentially V-shaped cross-section, with facing, bent over edges, to grip the leading edge of paper web 10 (see FIG. 8). The strip forming the clamp 51 extends over a portion of the width of the machine, and receives the leading edge of the paper web 10. The legs of the strip are resilient, so that the leading edge of paper web 10 is clamped or gripped therein. A stiffening brace 52, between connector 50 and the strip, holds the strip transverse to the threading chain 17, and thus improves guidance and stiffness of the assembly and permits threading of the paper web with pull on the paper web being exerted only from one side thereof.

Various changes and modifications may be made; for example, the control system may be constructed to be electrically controlled, with the position of the chain 17 being determined either by proximity switches, optoelectrical sensors, or by mechanical sensor switches. These switches are arranged along the length of the threading path, preferably in such a manner that when the leading edge of the threading element 17 reaches the next succeeding drive motor, it is energized to accept the threading force, while the motor, which will then be located adjacent the trailing end, is de-energized. Buckling and deformation of the chain is thereby effectively prevented. The switches need not be arranged in such a manner that they function simultaneously as ON-OFF switches, but some of the switches may be set to merely turn one of the motors ON, with other switches arranged to turn the associated motors OFF (for example, similar to a two-switch control system for electric lights). Features described in connection with any one of the embodiments may, within the scope of the inventive concept, be used with any other.

We claim:

1. A rotary printing press having a paper web threading apparatus comprising at least one threading element (17) which is flexible and elongated, extends across each side of the press, is of finite length, and has a leading end and a trailing end and is movable along a threading path;

paper gripping means (51) secured to the threading element to grip the leading edge of the paper web;

a plurality of compressed air motors forming drive elements (30–33) fixed to the frame, located along said path in spaced positions and engageable with said at least one threading element (17) to move the same, the length of said threading element being longer than the maximum distance between said compressed air motors;

and a plurality of switch means (29) each controlling one of said compressed air motors located along said path, operated by the presence of the leading end of the threading element adjacent a compressed air motor, to energize the respective compressed air motor then adjacent the trailing end of the threading element.

2. Printing press according to claim 1, wherein energization of the compressed air motor (30, 31, 32) adjacent the leading end of the threading element (17) and de-energization of the drive element adjacent the trailing end of the threading element (17) is substantially simultaneous.

3. Printing press according to claim 1, comprising a plurality of drive wheels (34), each drive wheel being driven by one of the compressed air motors (30–33) engaging the threading element (17).

4. Printing press according to claim 3, wherein the threading element (17) is a sprocket-roller chain and each drive wheel (34) is a sprocket wheel.

5. Printing press according to claim 3, wherein the drive wheeels (34) are engageable with the threading element (17) in interlocking, movable engagement.

6. Printing press according to claim 1, wherein the compressed air motors (11-16; 30–33) are reversible.

7. Printing press according to claim 1, further comprising guide track means (18) to guide the threading element (17) located along said threading path and having essentially open channel shape.

8. Printing press according to claim 7, wherein guide track means (18) are made of plastic material.

9. Printing press according to claim 1, wherein said threading path defines the path of the paper web through the printing press and includes at least a circuitous portion;

and a return path is defined, differing, at least in part, from said threading path and short-circuiting by essentially straight stretches the circuitous portion.

10. Printing press according to claim 9, further comprising guide track means (18, 18a-d) to guide the threading element, (17) and defining at least part of said paths;

and track switch means (39) controlling the path of the threading element in the guide track means.

11. Printing press according to claim 10, wherein the guide track means comprises an elastic portion (18c) cooperating with the track switch means (39).

12. Printing press according to claim 10, wherein the track switch means comprises a rotatable disk (39) predetermined biased into a respective switching position.

13. Printing press according to claim 10, wherein the track switch means comprises a slider (FIG. 5: 43) carrying respective guide track portions (44, 45) and defining, selectively, one of said paths.

14. Printing press according to claim 10, wherein said paths have at least one intersection point;

and the track switch means comprises a resiliently biased switching tongue (FIG. 6: 46, 47) located at the intersection point of said paths and resiliently biased to direct said threading element (17) when traveling in one of the paths in a first direction, and to be deflectable to another one of the paths by said threading element when traveling in the opposite direction.

15. Printing press according to claim 1, wherein the paper gripping means comprises a holding strip (FIG. 7: 51) connected to the threading element and extending substantially transversely with respect thereto, and including clamping means to clamp the leading edge of the web being threaded through the press.

16. Printing press according to claim 1, including a source of compressed air;

wherein at least some of the switch means (29) comprises pneumatic sensing elements responding to the presence of the threading element opposite the sensing element, the sensing elements controlling supply of compressed air to the respective compressed air motors.

17. Printing press according to claim 16, wherein the sensing elements comprise compressed air sensing nozzles, and compressed air valves (60, 62, 65, 73) and valves (63, 64, 74) are provided to control the supply or venting of compressed air under operating pressure through the compressed air motors.

18. Printing press according to claim 1, further comprising initial and terminal start and stop control switches (62, 69) and valves (63, 71; 67, 73) connected to and controlled by said initial and terminal switches to control supply of compressed air to the respective compressed air motors.

* * * * *